(12) United States Patent
Stadtfeld

(10) Patent No.: US 11,746,853 B2
(45) Date of Patent: Sep. 5, 2023

(54) PERICYCLIC TRANSMISSION

(71) Applicant: THE GLEASON WORKS, Rochester, NY (US)

(72) Inventor: Hermann J. Stadtfeld, Manderscheid (DE)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 17/755,006

(22) PCT Filed: Nov. 10, 2020

(86) PCT No.: PCT/US2020/059810
§ 371 (c)(1),
(2) Date: Apr. 19, 2022

(87) PCT Pub. No.: WO2021/096844
PCT Pub. Date: May 20, 2021

(65) Prior Publication Data
US 2022/0397182 A1    Dec. 15, 2022

Related U.S. Application Data

(60) Provisional application No. 62/933,707, filed on Nov. 11, 2019.

(51) Int. Cl.
*F16H 1/32* (2006.01)
*F16H 23/00* (2006.01)
*F16H 1/28* (2006.01)

(52) U.S. Cl.
CPC ............ *F16H 1/321* (2013.01); *F16H 23/00* (2013.01); *F16H 2001/2881* (2013.01)

(58) Field of Classification Search
CPC ... F16H 1/321; F16H 2001/2881; F16H 23/00
See application file for complete search history.

(56) References Cited

U.S. PATENT DOCUMENTS 3,590,659 A * 7/1971 Maroth .................... F16H 23/00
475/164
4,620,457 A   11/1986 Distin et al.
(Continued)

FOREIGN PATENT DOCUMENTS

CN    2235046 Y * 9/1996
DE    3739238 A1   5/1988
(Continued)

OTHER PUBLICATIONS

Mathur et al., "Pericyclic Transmission Prototype: Detailed Component Design, Analysis and Fabrication", AHS—The Vertical Flight Society, 75th Annual Forum & Technology Display, Philadelphia, PA, May 13-16, 2019.
(Continued)

*Primary Examiner* — Justin Holmes
(74) *Attorney, Agent, or Firm* — Robert L. McDowell

(57) ABSTRACT

Pericyclic transmission having at least one input shaft (58) rotatable about an axis of rotation and at least one inclined bearing seat (55, 56) secured to the input shaft with the inclined bearing seat being oriented at an inclination angle with respect to the axis of rotation of the input shaft. An input gear (52, 54) is attached to each inclined bearing seat with the input gear being oriented at the inclination angle and having an axis of rotation inclined to the axis of rotation of the input shaft by the inclination angle whereby upon rotation of the input shaft, the input gear performs at least a nutating motion. The transmission also includes an intermediate gear (51, 53) in mesh with the input gear with the intermediate gear having an axis of rotation coincident with the axis of rotation of the input shaft. The intermediate gear communicates with a transmission output.

20 Claims, 12 Drawing Sheets

(56) References Cited

U.S. PATENT DOCUMENTS

| | | | |
|---|---|---|---|
| 4,702,126 A | | 10/1987 | Nakamura |
| 4,946,428 A | | 8/1990 | Barozzi |
| 5,954,610 A | * | 9/1999 | Kamimura ................. B23F 9/02 |
| | | | 475/180 |
| 7,147,583 B2 | | 12/2006 | Lemanski |
| 7,291,081 B2 | * | 11/2007 | Bausola .................. F16H 1/321 |
| | | | 475/169 |
| 2016/0341282 A1 | * | 11/2016 | Robuck ................... F16H 1/321 |

FOREIGN PATENT DOCUMENTS

| | | |
|---|---|---|
| EP | 0078111 A2 * | 5/1983 |
| EP | 0332450 A2 | 9/1989 |
| JP | 60-201145 A | 10/1985 |

OTHER PUBLICATIONS

International Search Report and Written Opinion for PCT/US2020/059810, ISA/EPO, dated May 31, 2021, 13 pgs.

\* cited by examiner

PERICYCLIC TRANSMISSION

FIELD OF THE INVENTION

The invention is directed to a pericyclic transmission which cancels the unbalancing moments or forces with a reduced number of gears versus the state of the art solution, in particular by providing different output configurations.

BACKGROUND OF THE INVENTION

FIG. 1 shows two ring gears 10 and 11 in mesh with each other in zone 15. Tooth 1 and slot 1 are shown in the fully engaged position. The number of teeth of gear 10 and 11 differ only by one or two. The angle 14 between the input shaft 12 and the output shaft 13 is slightly smaller than 180°. The two gears 10 and 11 have a conventional arrangement (not pericyclic) but are the base elements of pericyclic transmissions.

Pericyclic transmissions consist of 4 to 8 bevel gears. Each pair of bevel gears has a shaft angle which is close to 180°. The number of teeth of each pair of meshing bevel gears differs by one or two. FIG. 1 shows a gear pair with nearly the same number of teeth and a shaft angle 14 close to 180° in a conventional arrangement (not pericyclic). Pericyclic transmissions use between two and four bevel gear pairs like the one shown in FIG. 1 as base elements and introduce a pericyclic nutating motion to two or four of the bevel gears in order to achieve high reduction ratios.

The lowest possible shaft angle difference to 180° of the mating bevel gears as shown in FIG. 1 is defined by the whole depth of the teeth. In order for the teeth to mesh only in one zone 15 at the circumference and be disengaged at the opposite side, zone 16, the shaft angle needs to be at least $$180° - \arctan\{[(\text{hole depth}) \cdot 2 + \text{clearance}]/(\text{outer cone distance})\}.$$

The clearance amount 17 needs to be about 50% of the whole depth of the teeth or larger to allow meshing between the two mating gears. Meshing conditions are different from standard bevel gear ratios of one to five. Due to the nearly 180° shaft angle there is a large engagement zone 15 between the meshing teeth. The size of the engagement zone angle is normally chosen below 90°, because the difference of one or two teeth between the mating gears will result in one of the two gears to rotate faster. This means in case the first gear 10 has one tooth more than the second gear 11 and if tooth No. 1 of the second gear is engaged with slot No. 1 of the first gear, then tooth No. 1 will get disengaged at the end of the engagement zone and passes one tooth of the first gear in order to re-engage but now with slot No. 2 of the first gear while it enters at the other end of the engagement zone. The process of disengagement, passing one tooth and re-engaging with the next slot requires not only enough clearance between the tips of the mating teeth, it also requires a sufficient angle of the dis-engagement zone to make the passing of one tooth possible without interference.

If the first gear 10 and the second gear 11 are connected to separate shafts (12 and 13), having a shaft angle smaller than 180°, as shown in FIG. 1, then the ratio will be the number of teeth of the second gear 11 divided by the number of teeth of the first gear 10 ($z_2/z_1$). In case of $z_1=40$ and $z_2=41$ the ratio is commonly expressed as 40×41 or 0.9756.

In a pericyclic transmission the nearly 180° shaft angle bevel gear pair is utilized differently than shown in FIG. 1. FIG. 2 shows gear 20 meshing in zone 22 with gear 21. Gear 21 is rigidly connected (or one piece) with gear 23 and gear 23 meshes with gear 24 in zone 19. The shaft angle between gear 20 and gear 21 is shown by 26 and the shaft angle between gear 23 and gear 24 is shown by 27. In order to give the transmission in FIG. 2 a pericyclic function, the center shaft section 30 is machined eccentric under an angle of 180°-angle 26 which is equal to 180°-angle 27. The nutating gears 21 and 22 have to be arranged with a bearing on the angled shaft section 30, such that the pitch lines of gears 20, 21, 23 and 24 are all intersecting at point 50, which is also the crossing point of the shafts 29 and 33. The bearing enables the nutating gears 21 and 23 to be freewheeling on angled shaft 30, such that the contact zones 22 and 19 (which have a 180° rotational offset angle) revolve around the circumference of gears 20 and 24. This wobble motion has the frequency of the input RPM. Gears 21 and 23 however will only rotate by one or two angular pitches per wobble revolution, depending on the number of teeth combination between gears 20 and 21. The number of teeth combination between gears 23 and 24 has to be different than between gears 21 and 20 in order to achieve an output rotation 32 different than zero (see ratio calculation below).

The ratio calculation of pericyclic transmissions is significantly different than the common ratio calculations of gear transmissions. The calculation is explained with the following example:

Number of teeth gear 20: $z_{20}=40$
Number of teeth gear 21: $z_{21}=41$
Number of teeth gear 23: $z_{23}=61$
Number of teeth gear 24: $z_{24}=60$ The calculation begins at the rotationally constrained gear and its mate which, in FIG. 2, is gear 20 that is rigidly connected to the gearbox housing 31 and therefore constrained, and gear 21 which is the first gear in mesh with the constrained gear. In a pericyclic transmission the input rotation rotates the inclined center shaft 30, which holds gears 21 and 23 via bearings (no positive torque connection). When the input rotation 28 rotates the input shaft 29 which is connected to inclined shaft section 30, then instead of a nearly same fast rotation of gears 21 and 23, only a nutating or wobble motion occurs. Each nutation of the inclined shaft 30 will rotate gear 21 (and the connected gear 23) by one pitch backwards based on the angular pitch of gear 21 ($\Delta\varphi_1 = -360°/41 = -8.7805°$). The nutating interaction between gear 23 and 24, will rotate gear 24 forwards by one pitch based on the pitch of gear 23 ($\Delta\varphi_2 = 360°/60 = 6.0°$). This means, the output shaft 32 rotates $\Delta\varphi_1 + \Delta\varphi_2 = -2.7805°$ for each full revolution of the input shaft 28. The ratio of this pericyclic transmission is $i_{Pericyclic} = 360°/(-2.7805°) = -129.47368$. This ratio calculation is based on the convention of:

$$\omega_{Output} = \omega_{Input}/i_{Pericyclic}.$$

Another notation for the ratio calculation is:

$$i_{Pericyclic} = [(z_{constrained} - z_{first\ not\ constrained})/z_{first\ not\ constrained} + (z_{indirectly\ constrained} - z_{second\ not\ constrained})/z_{indirectly\ constrained}]^{-1}$$

whereas:

$i_{Pericyclic}$ ... Ratio of pericyclic transmission
$\omega_{Input}$ ... Angular velocity of input shaft
$\omega_{Output}$ ... Angular velocity of output shaft
$z_{constrained}$ ... Gear 20 (connected to housing)
$z_{first\ not\ constrained}$ ... Gear 21 (meshing with constrained gear)
$z_{indirectly\ constrained}$ ... Gear 23 (indirectly constrained with connection through 21 to 20)

$z_{second\ not\ constrained}$ ... Gear 24 (output gear is not constrained)

$$i_{Pericyclic}=[(z_{20}-z_{21})/z_{21}(z_{23}-z_{24})/z_{24}]^{-1}=[(40-41)/41+(61-60)/60]^{-1}=-129.47368$$

A transmission like the one shown in FIG. 2 (see, for example, U.S. Pat. No. 7,147,583 to Lemanski) is fully functional but it generates fluctuating axial forces due to the unbalance of the intermediate gears 21 and 23. Although the rotation of gears 21 and 23 is slow compared to the input RPM ($RPM_{21/23}=RPM_{Input}/i_{Pericyclic}$), the nutating wobble motion is fast and has the same frequency (1/min) than the input RPM. The nutating wobble motion will cause fluctuating moments around axis 50 which alternate between the clockwise (cw) direction 26 and the counter clockwise (ccw) direction 27 which act on the gearbox housing 31. The generated structural vibrations due to the unbalance are not acceptable for all applications with input speeds above about 100 RPM.

The state of the art elimination of the unbalance is achieved by connecting a second, mirror imaged pericyclic unit with the first pericyclic unit as shown in FIG. 3 (see, for example, Mathur et al., "Pericyclic Transmission Prototype: Detailed Component Design, Analysis and Fabrication", AHS—The Vertical Flight Society, May 2019). Gear 40 is equal to gear 24, gear 41 is equal to gear 23, gear 43 is equal to gear 21 and gear 42 is equal to gear 20. The output gear 34 is located between and rigidly connected to gears 24 and 40. The input shaft 29 is rigidly connected with shaft sections 30, 33, 35, and 44. The reaction members (gear 20 and gear 42) are connected to the gearbox housing 31 and therefore cannot rotate. The input rotation 28 is transferred to the output 45, where the output 45 has a reduced rotational speed.

The two units in FIG. 3 are connected with the output gear 34. Gear 40 is the mirror image of gear 24. Gear pair 41 and 43 is the mirror image of gear pair 21 and 23 and gear 42 is a mirror image of gear 20. Gear 42 is rigidly connected with the gearbox housing 31, like gear 20. The shaft sections 29, 30, 33, 35 and 44 are rigidly connected like one solid piece. The nutation wobble motions of the two intermediate gear pairs 21 and 23, and 41 and 43 in FIG. 3 have opposite directions, which leads to a complete cancelation of any system related unbalances. The output gear 34 is rigidly connected to gear 24 and gear 40. The ratio between the input shaft 29 and the output gear 34 is identical to the ratio of the transmission in FIG. 2.

Significant disadvantages of the state of the art solution include the fact that the number of gears required for balancing the pericyclic transmission has to double. Also the size of the transmission increases to about twice the size of the transmission shown in FIG. 2. Another disadvantage is the central location of the output gear 34 which requires an additional gear which meshes with gear 34 in order to provide a rotating output shaft.

SUMMARY OF THE INVENTION

The invention is directed to a pericyclic transmission which cancels the unbalancing moments or forces with a reduced number of gears versus the state of the art solution by providing different output configurations.

The pericyclic transmission comprises at least one input shaft rotatable about an axis of rotation and at least one inclined bearing seat secured to the input shaft with the inclined bearing seat being oriented at an inclination angle with respect to the axis of rotation of the input shaft. An input gear is attached to each inclined bearing seat with the input gear being oriented at the inclination angle and having an axis of rotation inclined to the axis of rotation of the input shaft by the inclination angle whereby upon rotation of the input shaft, the input gear performs at least a nutating motion. The transmission also comprises an intermediate gear in mesh with the input gear with the intermediate gear having an axis of rotation coincident with the axis of rotation of the input shaft. The intermediate gear communicates with a transmission output.

DETAILED DESCRIPTION OF THE PREFERRED EMBODIMENT

Figure 1:
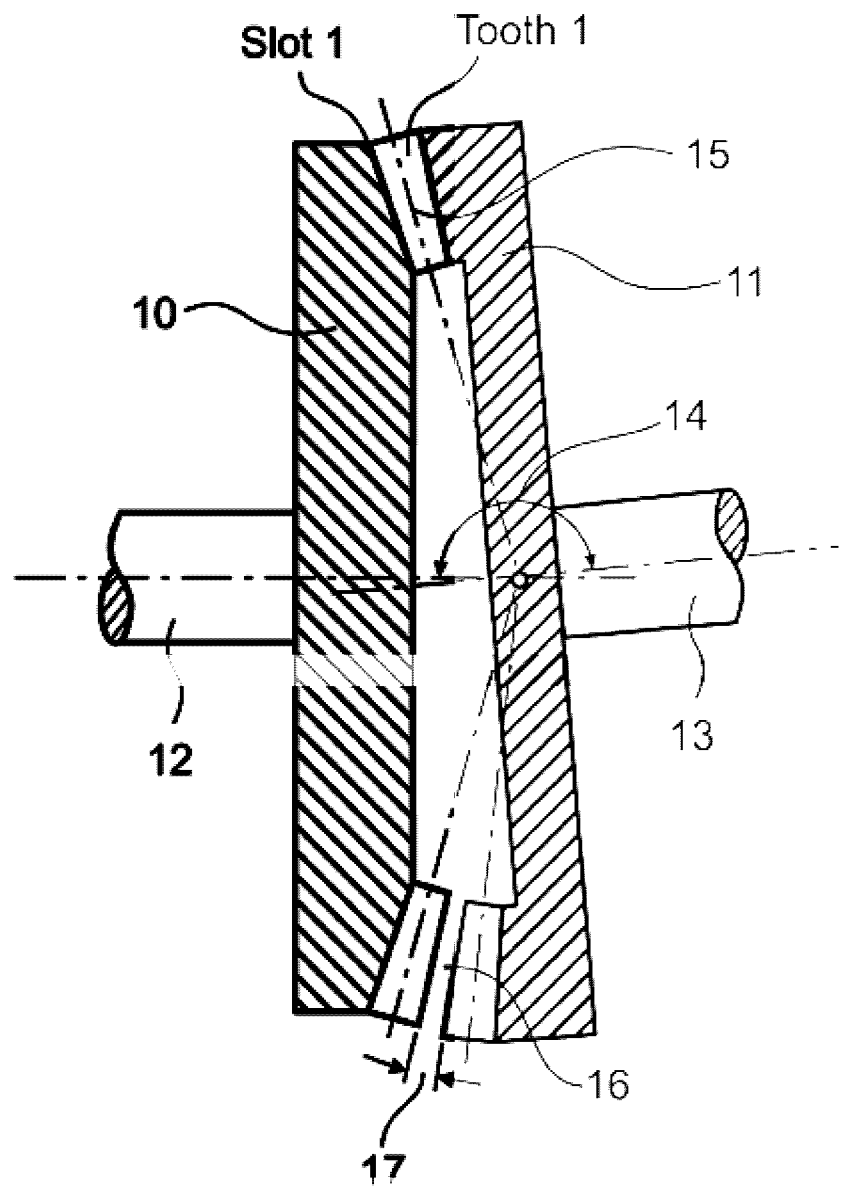
FIG. 1 illustrates two ring gears with one tooth difference.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. The size and relative sizes of certain aspects or elements may be exaggerated for clarity or detailed explanation purposes. For a better understanding of the invention and ease of viewing, doors, casings, internal or external guarding, etc. may have been omitted from the drawings.

The use of "including", "having" and "comprising" and variations thereof herein is meant to encompass the items listed thereafter and equivalents thereof as well as additional items. As used herein, the singular forms "a", "an" and "the"

are intended to include the plural forms as well, unless the context clearly indicates otherwise and the term "and/or" includes any and all combinations of one or more of the associated listed items.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless explicitly stated.

Figure 2:
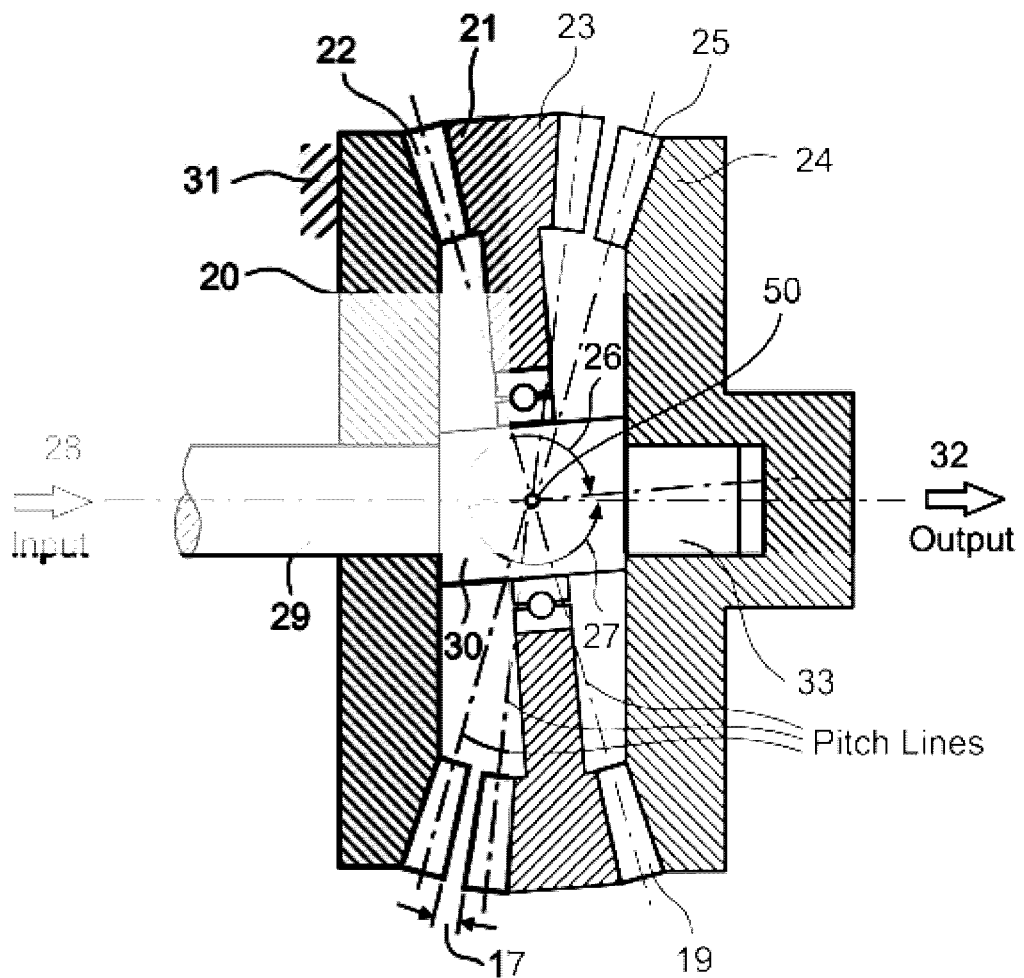
FIG. 2 shows a conventional pericyclic transmission.
Figure 3:
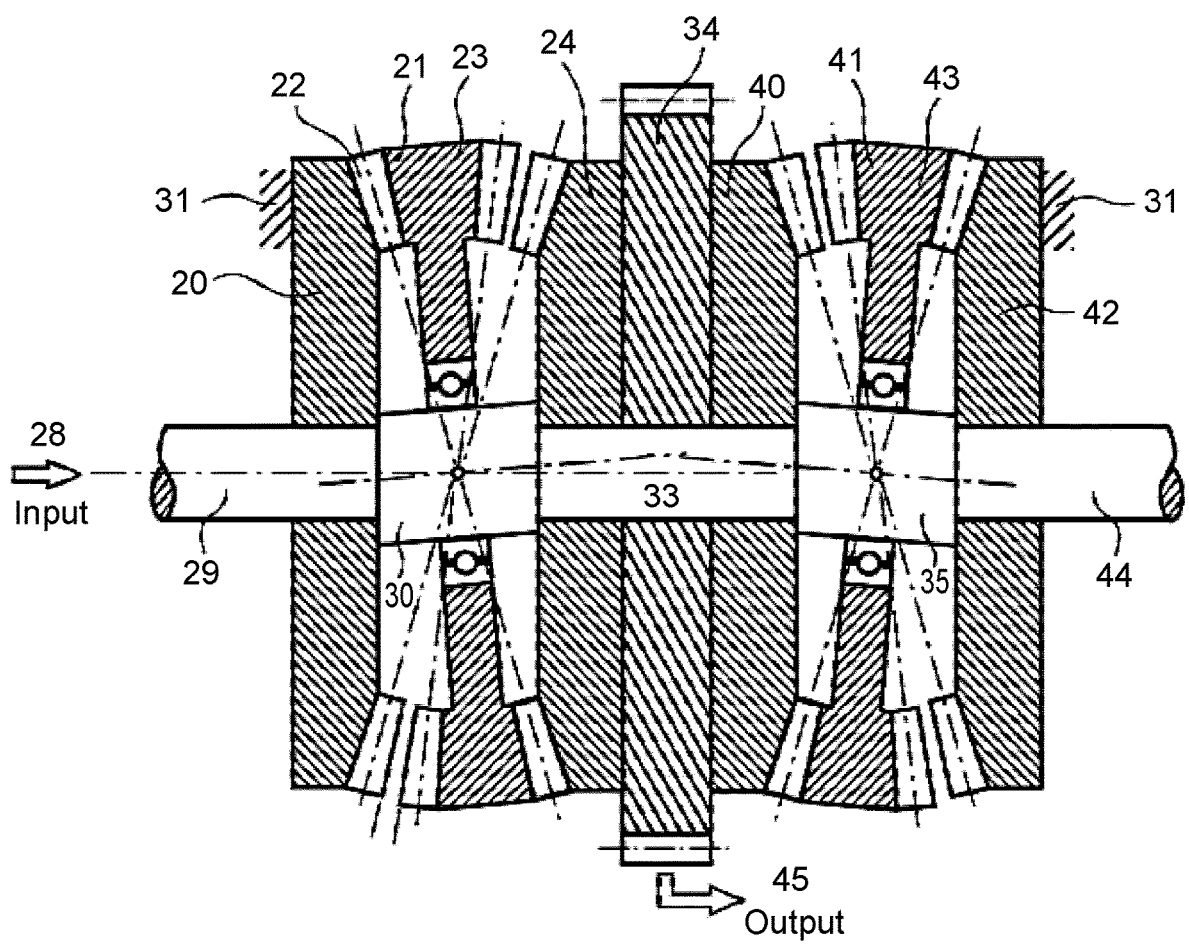
FIG. 3 shows a conventional balanced pericyclic transmission.
Figure 4:
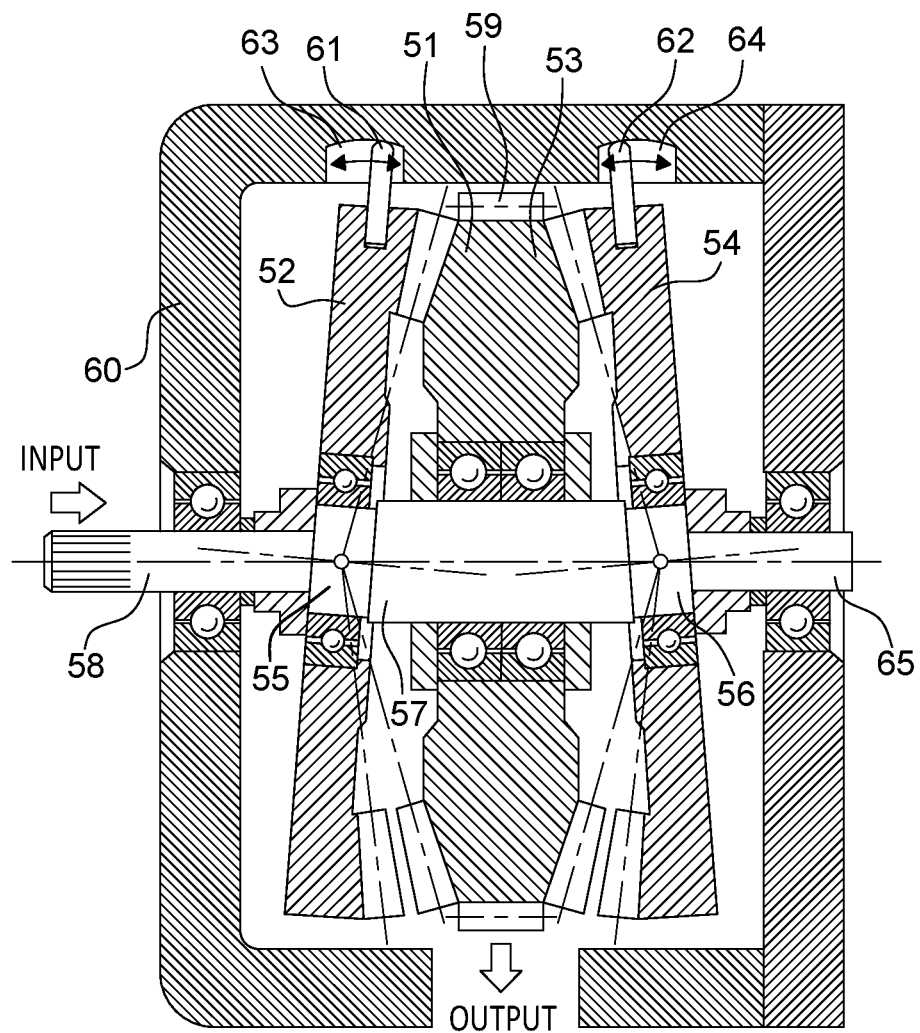
FIG. 4 illustrates a reversed pericyclic transmission with output through the side of transmission housing.

A first embodiment of the inventive solution shown in FIG. 4 reverses the concept of FIG. 2 and uses a centric mounted intermediate gear pair 51 and 53, attached to shaft section 57, with the gear pair consisting of two equal gears, preferably straight bevel ring gears, oriented back to back and having a cylindrical gear with teeth 59 located on their outer periphery. Gears 51 and 53 may be manufactured by non-generating or generating methods. The cylindrical gear 59 on the outer circumference of gear pair 51 and 53 is the pericyclic transmission output. The pericyclic motion is achieved by the tooth engagement between gears 52 and 51 and between gears 54 and 53 when the input shaft 58 rotates angled bearing seats 55 and 56 about their respective axes that are inclined with respect to the axis of rotation of input shaft 58. The tooth engagement zones rotate around the circumference of input gears 52 and 54 while gear 52 and gear 54 wobble without rotating.

The input gears 52 and 54 are preferably identical internal gears, preferably non-generated straight internal bevel gears, mounted in a mirror image orientation, and perform the nutating motion initiated by the inclined bearing seats 55 and 56. Alternatively, the internal gears may be internal face gears or the internal gears may comprise curved teeth. The gears 52 and 54 are restrained from rotation by the swing pins 61 and 62 which are engaged in slots 63, 64 inside of the transmission housing 60. The input shaft 58 is rigidly connected with the shaft sections 55, 57, 56, and 65. This arrangement results in gears 52 and 54 being nutating reaction gears and gears 51, 53, and 59 being a slow rotating output unit. The input shaft 58 and sections 55, 57 and 56 and 65 may be formed from a single piece of material (e.g. steel).

If, for example, input gears 52 and 54 have 41 teeth, and intermediate gears 51 and 53 have 40 teeth, then each revolution of the input shaft 58 will nutate (i.e. wobble) but not rotate input gears 52 and 54 and therewith rotate the intermediate gear pair 51, 53 by one pitch in negative direction. It is preferable if the difference in the number of teeth of an input gear and a mating intermediate gear is in the range of 1 to 5, more preferably 1 or 2.

Rotation is transmitted via the cylindrical gear 59 to a second cylindrical gear at the outside of the transmission housing 60 which is mounted on an output shaft (not shown). Gear 59 will make one revolution forward if the input shaft 58 turns 40 times (ratio $i_{Pericyclic}=[1/40]^{-1}=40$).

$$i_{Pericyclic}=[(z_{constrained}-z_{first\ not\ constrained})/z_{first\ not\ constrained}]^{-1}$$

$$i_{Preicyclic}=[(z_{52}-z_{51})/z_{51}]^{-1}=[(z_{53}-z_{54})/z_{54}]^{-1}=[(41-40)/40]^{-1}=40$$

Figure 5:
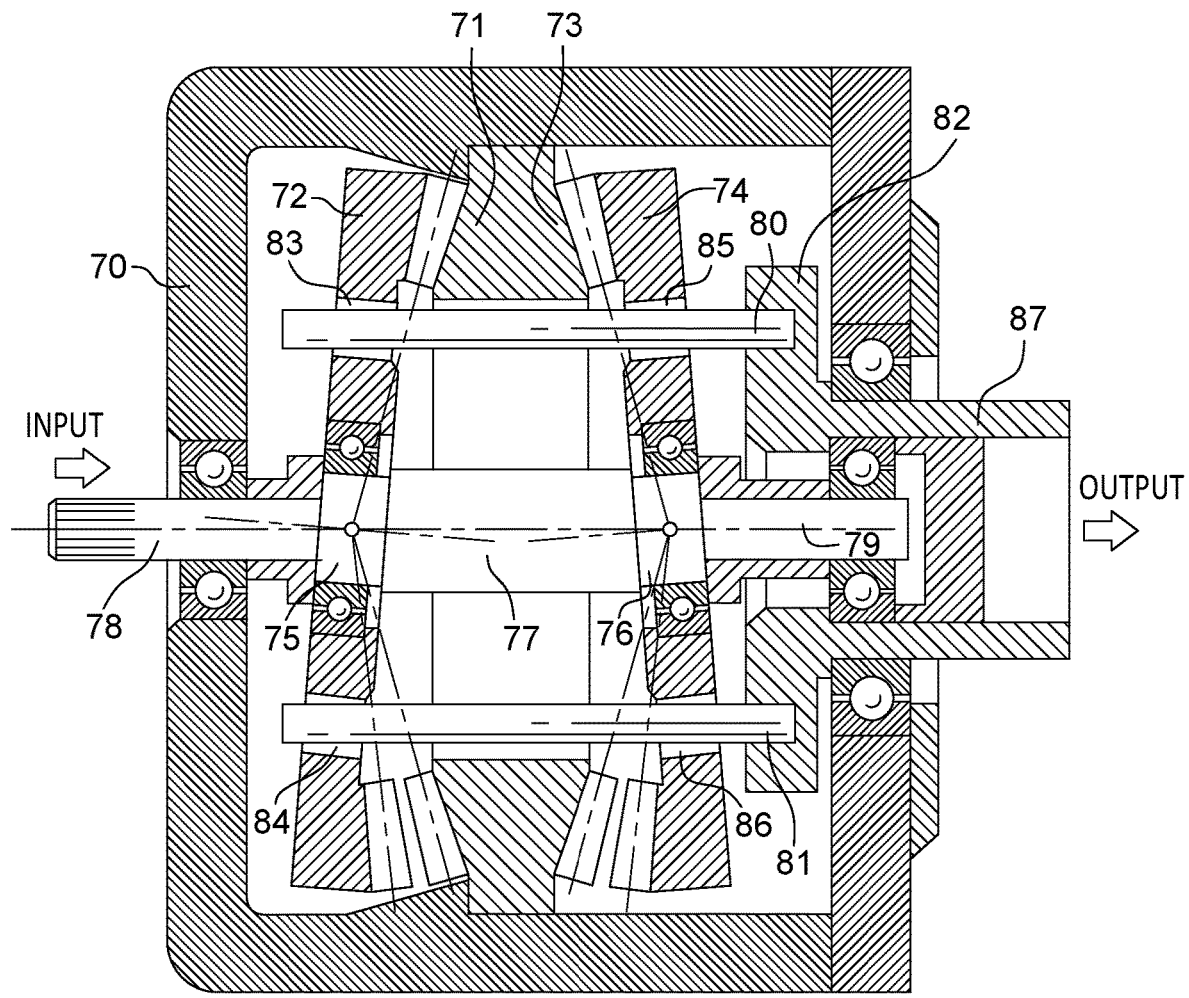
FIG. 5 illustrates a reversed pericyclic transmission with input and output shafts in-line.

Another embodiment of the invention with an output shaft 87 which is in-line with the input shaft 78 is shown in FIG. 5. The concept in FIG. 5 also reverses the concept of FIG. 2 by using a centric mounted intermediate gear pair 71 and 73. The intermediate gear pair 71 and 73 is connected with the gearbox housing 70, while the gears 72 and 74 perform the nutating motion initiated by the inclined bearing seats 75 and 76. The intermediate gear pair 71 and 73 are identical gears which are oriented back to back in one unit. The nutating gears 72 and 74 are also identical, but mounted in a mirror image orientation. One revolution of the input shaft 78 rotates the two angled bearing seats 75 and 76 and achieves one full nutating motion which will rotate gears 72 and 74 by one or two angular tooth pitches (depending on the gear ratio). This rotation is transmitted via slots 83 and 85 to pin 80 and via slots 84 and 86 to pin 81. The pins 80 and 81 transmit the rotation to flange 82, which is one part with the output tube 87.

The input shaft 78 is rigidly connected with the shaft sections 75, 77, 76, and 79. If, for example, gears 72 and 74 each have 41 teeth and gears 71 and 73 each have 40 teeth, then each revolution of the input shaft 78 will rotate gears 72 and 74 by one pitch. The rotation is transmitted via the pins 80 and 81 to the flange 82 of the output tube 87. The output tube 87 will make one revolution backwards if the input shaft 78 turns 41 times (ratio $i_{Pericyclic}=-41$).

$$i_{Pericyclic}=[(z_{constrained}-z_{first\ not\ constrained})/z_{first\ not\ constrained}]^{-1}$$

$$i_{Preicyclic}=[(z_{71}-z_{72})/z_{72}]^{-1}=[(z_{73}-z_{74})/z_{74}]^{-1}=[(40-41)/41]^{-1}=41$$

Figure 6:
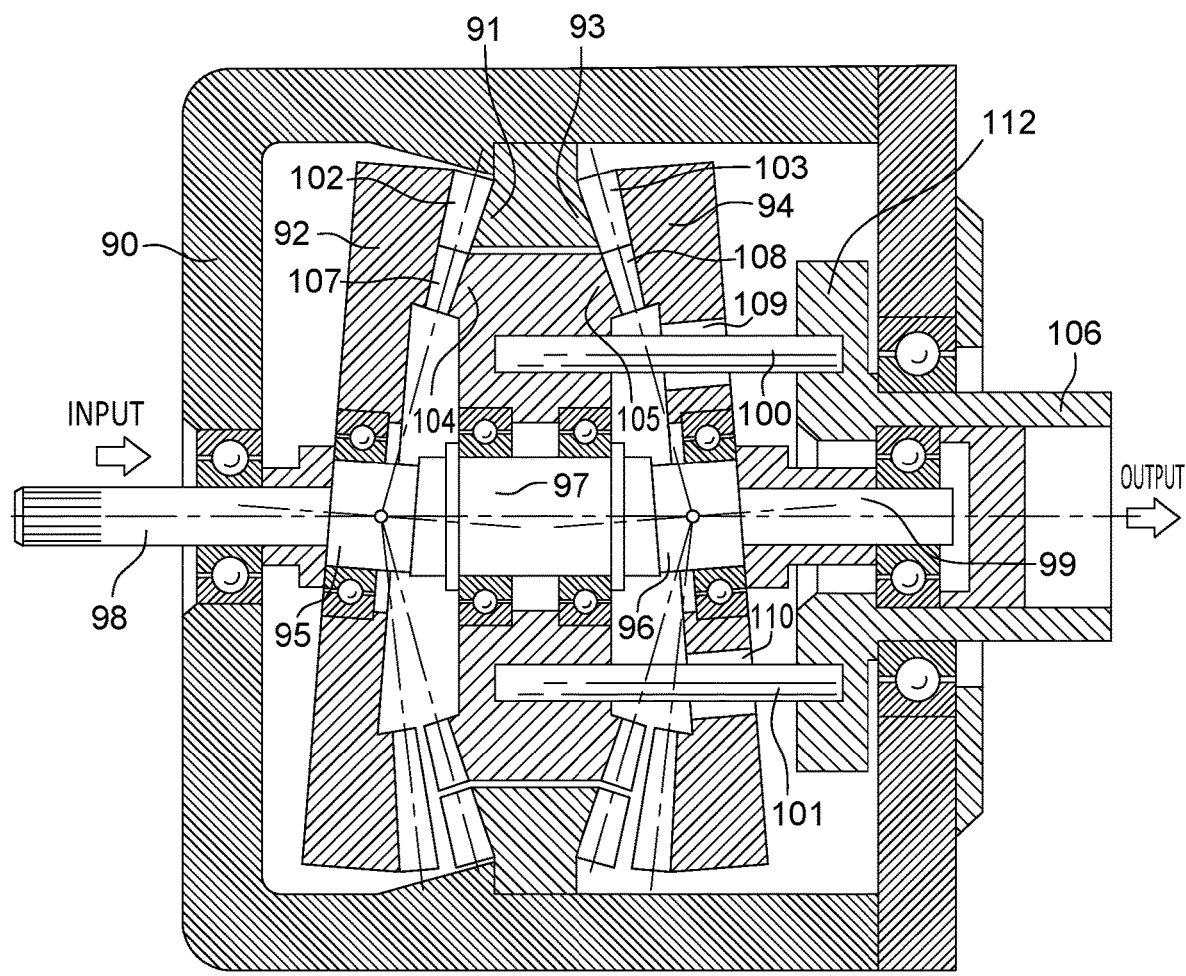
FIG. 6 shows an advanced reversed pericyclic transmission.

A preferred embodiment of the invention is shown in FIG. 6 which also reverses the concept of FIG. 2 by using a centric mounted intermediate gear pair 91 and 93. The intermediate gear pair 91 and 93 is connected with the gearbox housing 90, while the gears 92 and 94 perform the nutating motion initiated by the inclined bearing seats 95 and 96. Gears 92 and 94 are engaged with the outer halves 102 and 103 of their face widths with intermediate gears 91 and 93 which are the reaction members. The input shaft 98 is rigidly connected with the shaft sections 95, 97, 96, and 99. If gears 92 and 94 perform one nutating revolution, then they will both rotate by one or two angular tooth pitches (depending on the gear ratio). For example, if gears 92 and 94 have 41 teeth, and gears 91 and 93 have 40 teeth, then each revolution of the input shaft 98 will rotate gears 92 and 94 by one pitch.

In FIG. 6, the rotation of gears 92 and 94 is transmitted to the output shaft via the centric mounted transfer gear pair 104 and 105 via transfer pins 100 and 101 to the flange 112 and the output shaft 106. The transfer gear pair 104 and 105 is positioned centric to shaft 97 and is freely rotatable around shaft 97 with the teeth engaged with the inner halves 107 and 108 of the face widths of gears 92 and 94. The number of teeth between gears 92 and 104 and between gears 94 and 105 are identical which achieves the transmission of the exact rotational component of the motion of gears 92 and 94 (excluding the nutating wobble component) via transfer pins 100 and 101 to the flange 112 and then to the output shaft 106. The output shaft 106 will make one revolution backwards if the input shaft 98 turns 40 times (ratio $i_{Pericyclic}=-41$).

$$i_{Pericyclic}=[(z_{constrained}-z_{first\ not\ constrained})/z_{first\ not\ constrained}]^{-1}$$

$$i_{Preicyclic}=[(z_{91}-z_{102})/z_{102}]^{-1}=[(z_{93}-z_{103})/z_{103}]^{-1}=[(40-41)/41]^{-1}=41$$

The holes 109 and 110 provide a sufficient amount of clearance to the transfer pins 100 and 101 while the gear pair 104/105 rotates in mesh with gears 92 and 94. In order to maintain the clearance between pins 100 and 101 and the holes 109 and 110, the number of teeth of gears 92 and 104 as well as 94 and 105 are required to be identical.

Following are some application examples for electric vehicle drives.

Electric vehicles are propelled with high speed electric motors. Those electric motors operate at RPM's which are 3 to 5 times higher than the RPM's of internal combustion engines. The requirement of a speed reducing transmission between electric motor and driving wheels with very high ratios is therefore evident. Pericyclic transmissions can realize the required high ratios and also allow the high input speeds without the risk of flank surface scoring due to the fact that the relative motion between the meshing teeth is considerably lower compared to conventional high speed cylindrical gearboxes.

In cases where the drive unit with motor and transmission has to fit between the driving wheels, a compact solution is required. The power density and the compact layout of the inventive transmission examples in FIGS. 4, 5 and 6 appear to be well suited for the speed reduction task in an electric vehicle. One requirement of a final drive unit is the output shafts on both sides of the transmission. The drive shafts to the wheels have to be connected to the output shafts (or output flanges).

Figure 7:
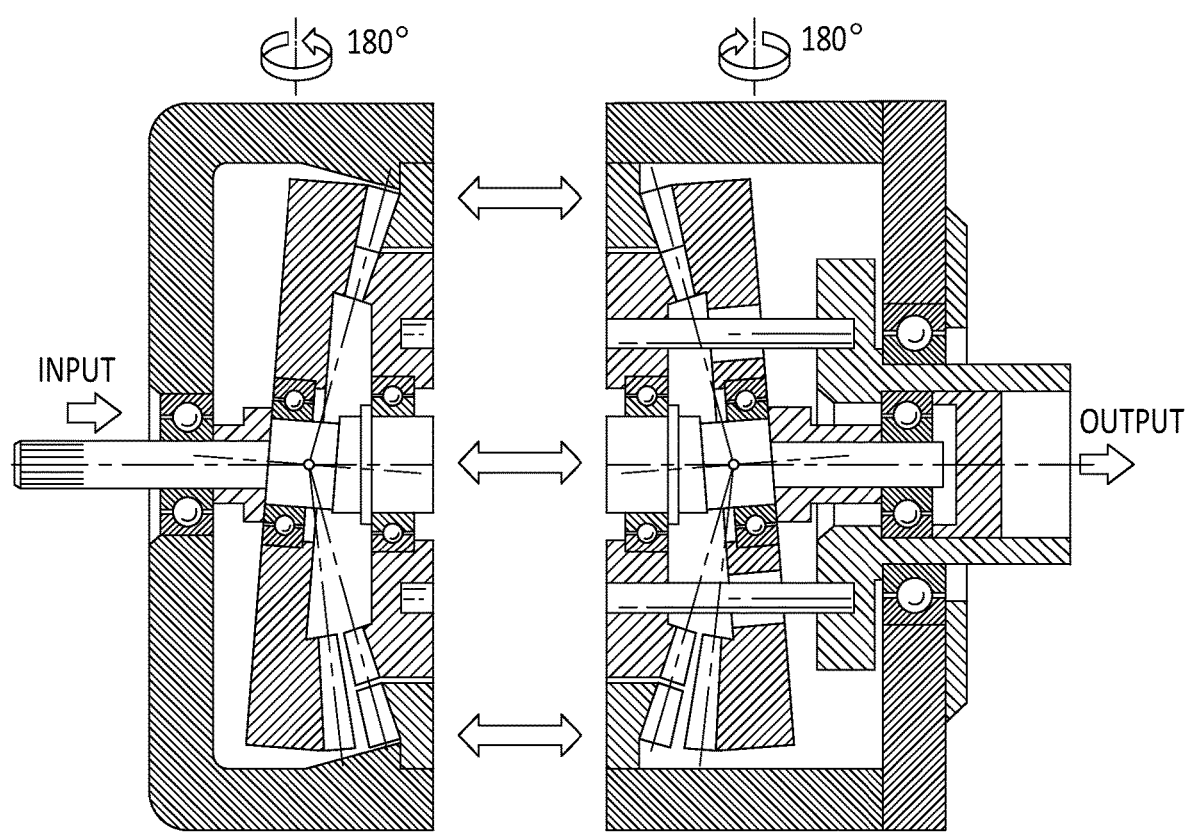
FIG. 7 shows the separation of the two nutating members of FIG. 6.
Figure 8:
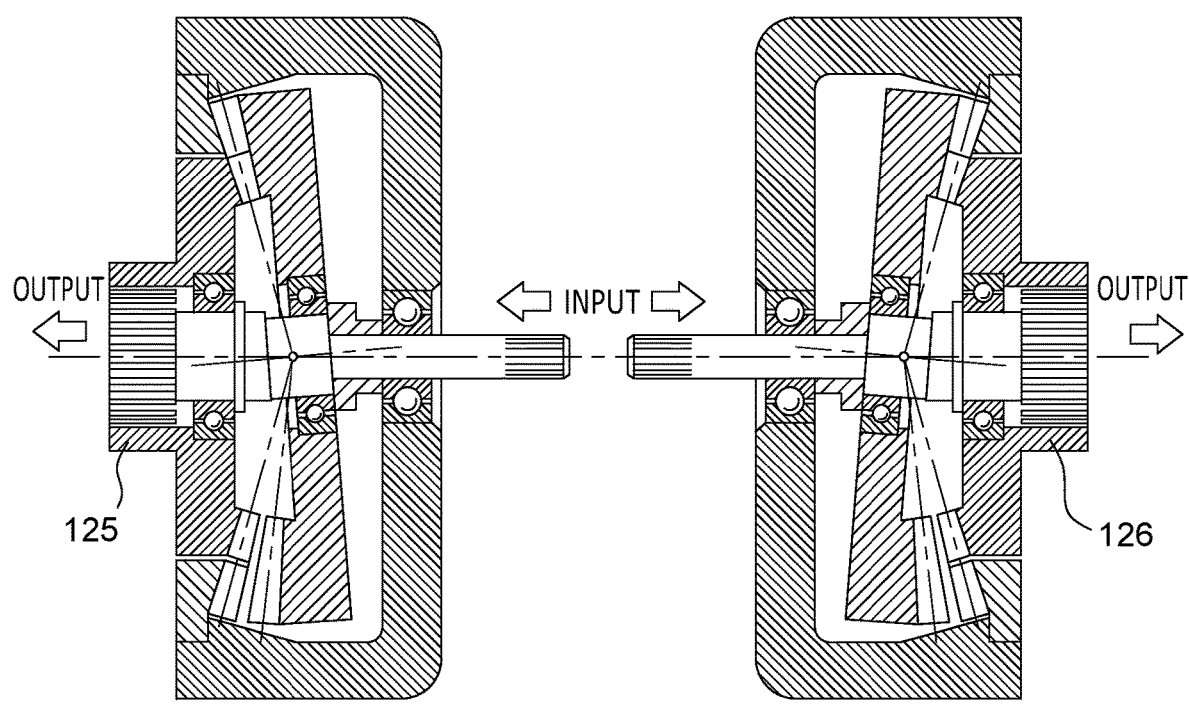
FIG. 8 illustrates the nutating members of FIG. 7 after rotation and after modifying input and output shafts.

FIG. 7 shows the transmission of FIG. 6 cut in two halves at the center with a vertical cut. After separating the two nutating members, each halve is rotated around a vertical axis by 180°. The result of this rotation is shown in FIG. 8. Also the input and output shafts have been reversed such that an electric motor can be placed between the two units and the drive shafts to the wheels can be connected on the outside of the two units.

Figure 9:
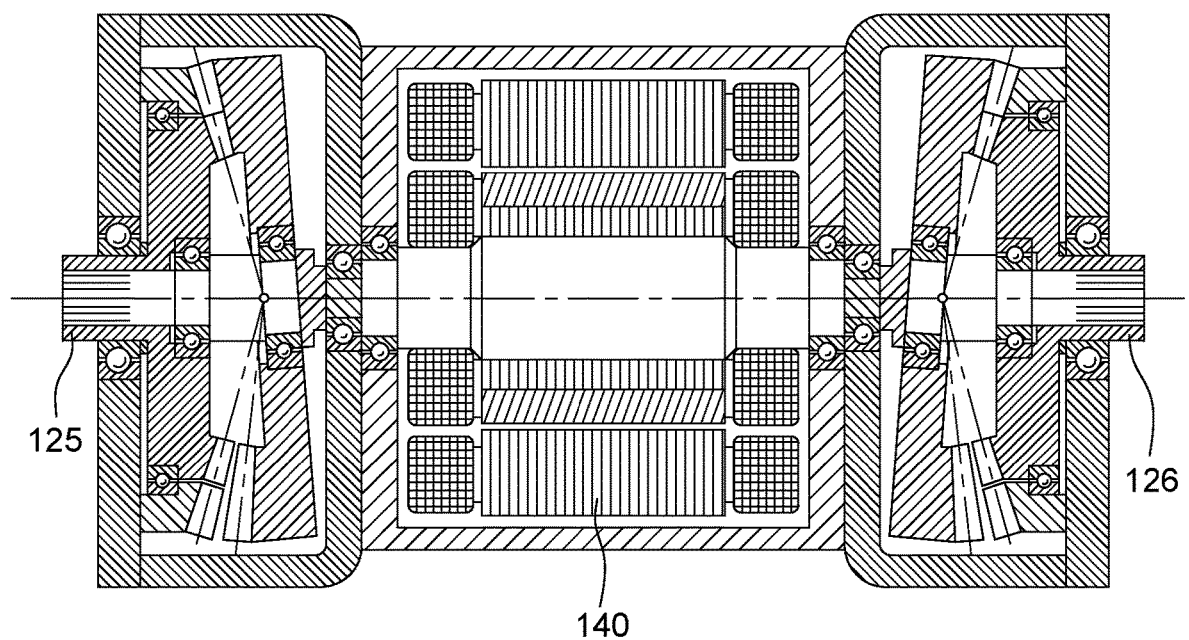
FIG. 9 shows the placement of an electric motor between the two transmission halves of FIG. 8.

FIG. 9 shows an arrangement comprising the placement of an electric motor 140 between the two transmission units of FIG. 8. The unit in FIG. 9 does not have the differential functionality. This functionality is required if a vehicle drives through a curve and the outer wheel drives a longer distance (has to rotate faster) than the inner wheel.

Figure 10:
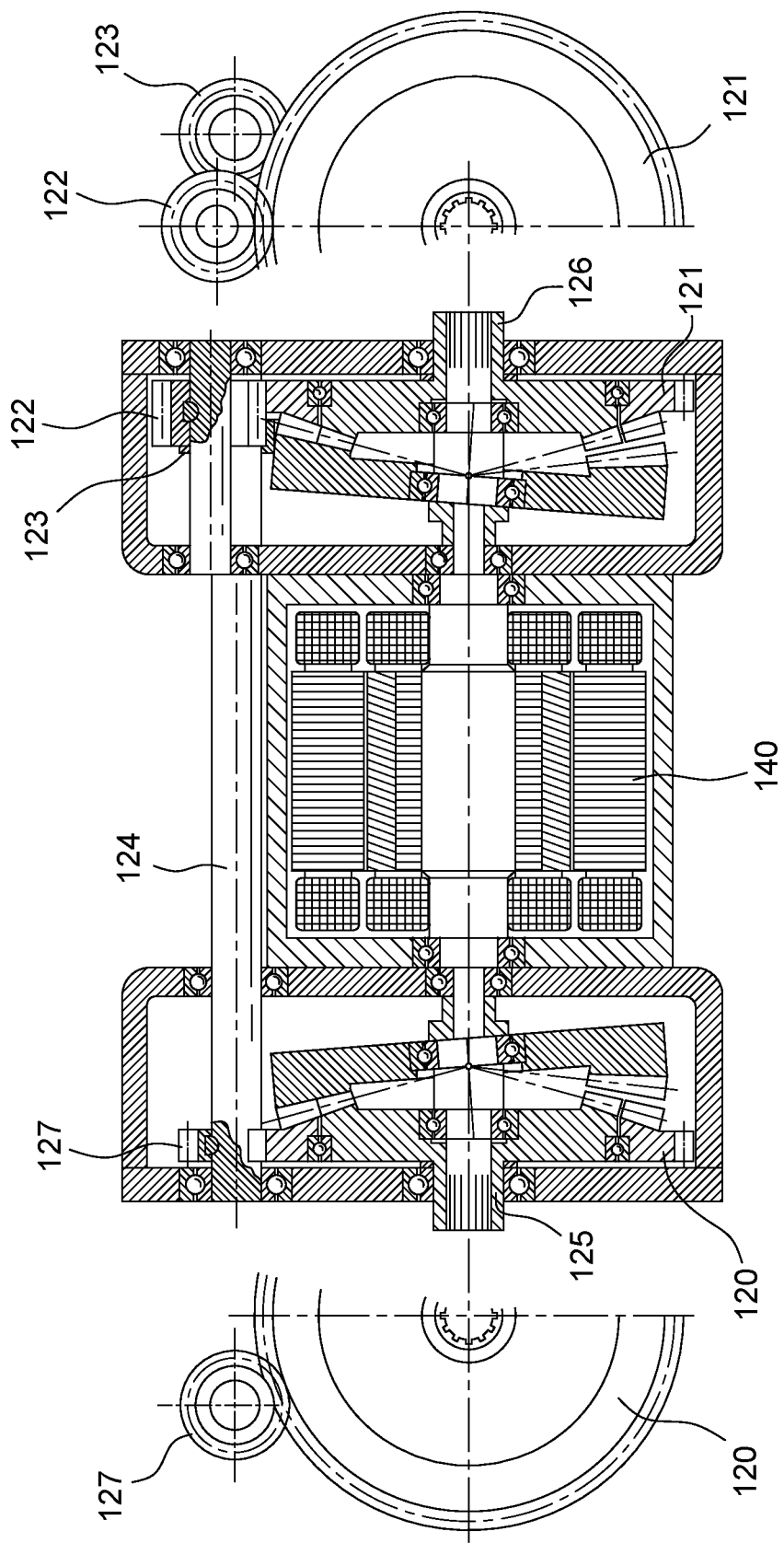
FIG. 10 shows transmission units connected with a differential shaft and idler.

The example shown in FIG. 10 solves the task of a differential function between the two output shafts 125, 126 by adding a connecting shaft with two pinions and an idler gear. The two reaction members 91 and 93 (FIG. 6) are no longer connected to the transmission housing but have teeth formed on their outside and are now numbered 120 and 121. Gear 121 is in mesh with idler pinion 122 which drives pinion 123 on shaft 124. Shaft 124 is rigidly connected to pinion 127 which is in mesh with gear 120. Pinions 122, 123 and 127 have the same number of teeth. This arrangement act like a differential between output shafts 125 and 126. If the vehicle, propelled with this unit drives through a curve, then the speed of the vehicle remains constant but if shaft 125 is connected to the wheel which drives on the outside of the curve, then shaft 125 will rotate a certain amount faster than the motor RPM and shaft 126 will rotate the same amount slower than the motor RPM in order to maintain the vehicle speed and accommodate the different arc lengths the two driving wheels have to travel while driving through the curve.

Figure 11:
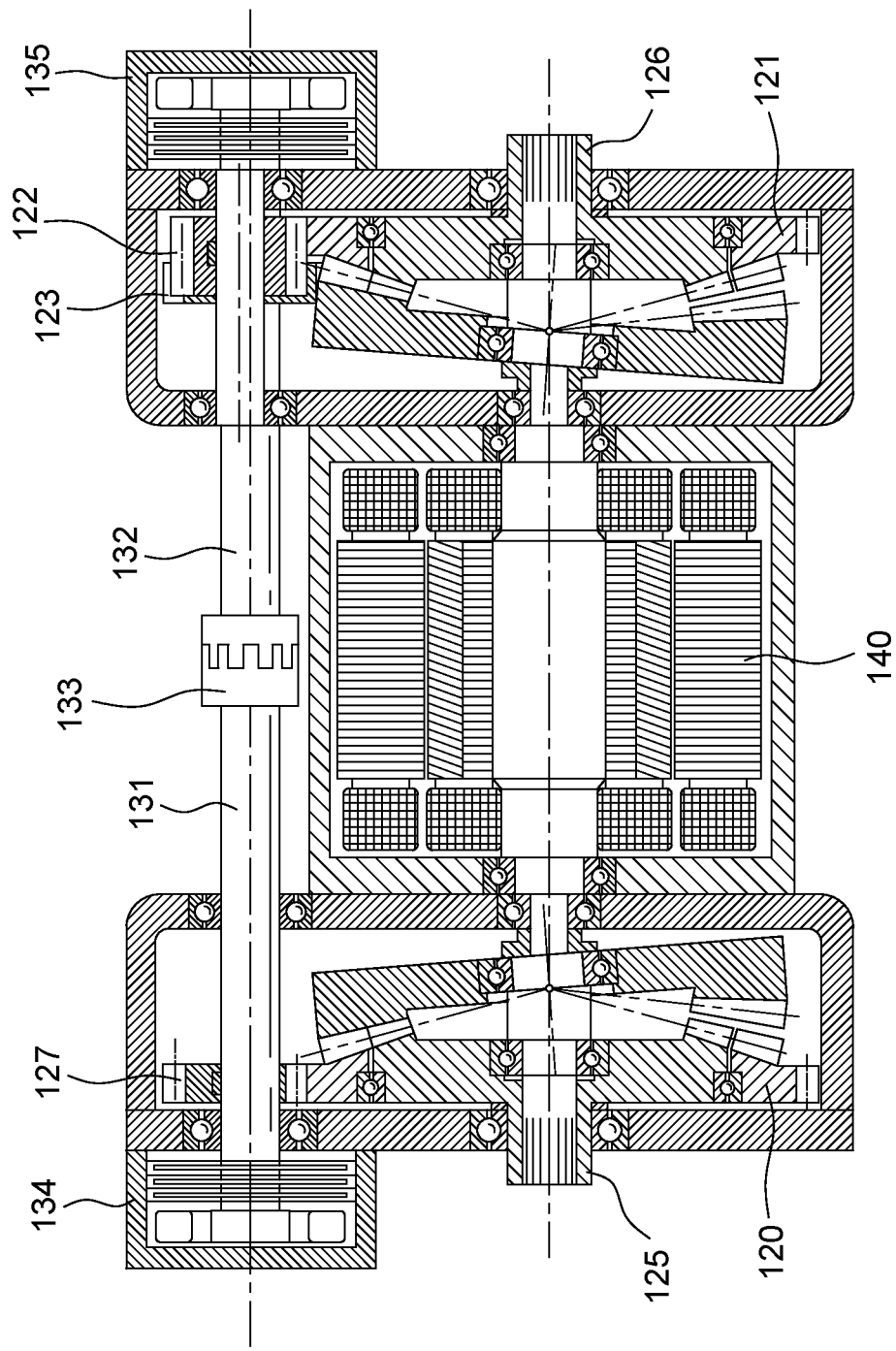
FIG. 11 illustrates additional coupling and clutches for torque vectoring and traction control.

In FIG. 11 shows the addition of one coupling and two clutches for torque vectoring and traction control. A coupling 133 is placed between the two half shafts 131 and 132. The additional clutches 134 and 135 can connect or disconnect shaft 131 and/or 132 to the transmission housing while coupling 133 is disconnected. This arrangement allows to control the amount of torque transmitted to the output shafts 125 and 126. Such functionality is called "torque vectoring" or "traction control".

If the motor 140 is replaced by two separately controlled motors 141 and 142 (FIG. 12) then a torque vectoring via electronic control of the two motors can also be realized. One side effect of this arrangement is the fact that the two nutating gears change their angular phase relationship (if the first motor rotates faster than the second motor) which will result in a certain unbalance of the unit.

Figure 12:
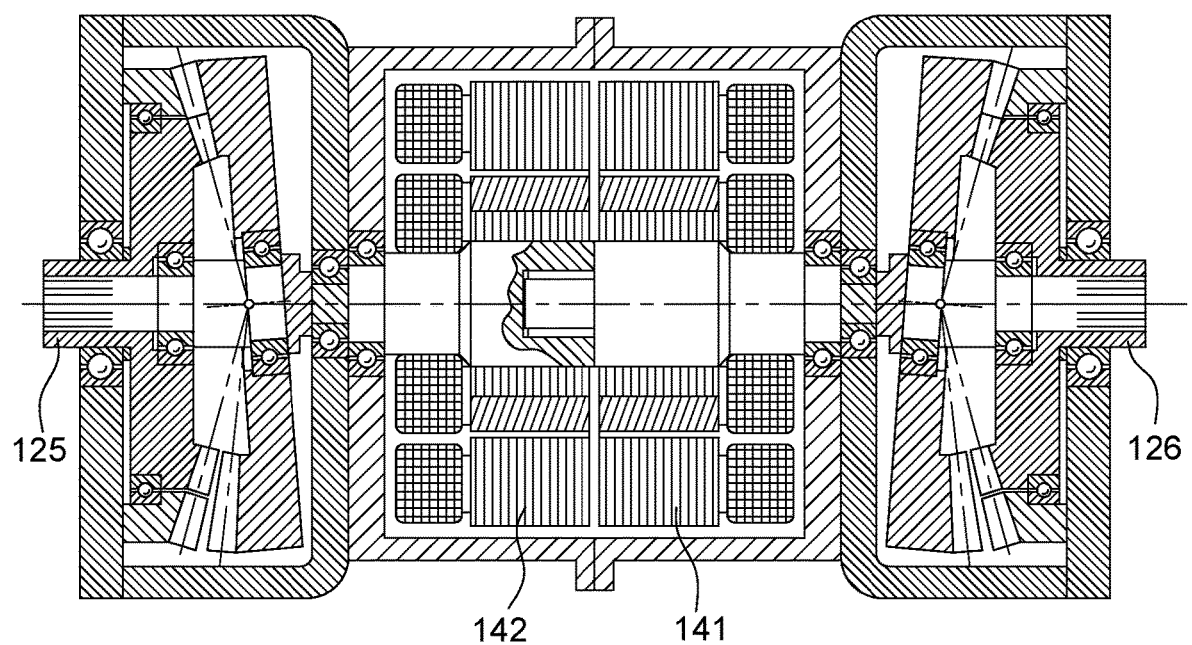
FIG. 12 shows a double motor arrangement.

FIG. 12 shows a double motor arrangement. By controlling each motor 141, 142 independently, torque vectoring respectively traction control can be accomplished without the need of a mechanical differential.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A pericyclic transmission comprising,
at least one input shaft rotatable about an axis of rotation,
at least one inclined bearing seat secured to an inclined shaft section rigidly connected to said at least one input shaft, said at least one inclined bearing seat being oriented at an inclination angle with respect to said axis of rotation of said at least one input shaft,
an input gear attached to each of said at least one inclined bearing seat, said input gear being oriented at said inclination angle and having an axis of rotation inclined to said axis of rotation of said at least one input shaft by said inclination angle, whereby upon rotation of said at least one input shaft, said input gear performs at least a nutating motion,
an intermediate gear in mesh with said input gear, said intermediate gear being attached to a shaft section with an axis of rotation coincident with said axis of rotation of said at least one input shaft, the tooth engagement of said mesh being the first tooth engagement of the pericyclic transmission as seen in the direction of the shaft sections starting from the input shaft,
said intermediate gear communicating with at least one transmission output and
said input shaft being, via said inclined shaft section, also rigidly connected to said shaft section with coincident rotation axis, said inclined shaft section being between said input shaft and said shaft section with coincident rotation axis.

2. The transmission of claim 1 wherein said input gear comprises an internal bevel gear or internal face gear.

3. The transmission of claim 2 wherein said internal bevel gear or internal face gear comprise straight teeth.

4. The transmission of claim 1 comprising two intermediate gears arranged back-to-back.

5. The transmission of claim 4 further comprising two input gears arranged facing one another in a mirror image orientation.

6. The transmission of claim 5 wherein said two input gears are restrained from rotating about their respective axis of rotation and wherein said two intermediate gear are rotatable about their respective axis of rotation.

7. The transmission of claim 6 wherein said two intermediate gears include an outer periphery and further include a cylindrical gear formed at the outer periphery, said cylindrical gear being said transmission output.

8. The transmission of claim 5 wherein said two input gears are rotatable about their respective axis of rotation and wherein said two intermediate gears are restrained from rotating about their respective axis of rotation.

9. The transmission of claim 8 wherein rotation of said two input gears is transmitted to said output via a plurality of transfer pins extending between said two input gears and said output.

10. The transmission of claim 8 further comprising a rotatable transfer gear pair arranged concentrically within the restrained two intermediate gears wherein rotation of said two input gears is transmitted to said output via a plurality of transfer pins extending between said transfer gear pair and said output, wherein the two input gears and the pair of transfer gears each have the same number of teeth.

11. The transmission of claim 1 wherein said input gear has a first number of teeth and said intermediate gear has a second number of teeth, and wherein said first number of teeth and said second number of teeth differ by 1 or 2.

12. The transmission of claim 1 comprising a first input shaft rotatable about said axis of rotation and a second input shaft rotatable about said axis of rotation, wherein said first input shaft and said second input shaft are axially aligned with one another and are arranged end-to-end, said transmission further comprising a first output associated with said first input shaft and a second output associated with said second input shaft.

13. The transmission of claim 12 comprising a first input gear and a second input gear with the first and second input gears being arranged back-to-back and spaced axially apart, said first and second input gears being rotatable.

14. The transmission of claim 13 further comprising a first intermediate gear and a second intermediate gear with the first and second intermediate gears being arranged facing one another in a mirror image orientation, said first and second intermediate gears being restrained from rotating.

15. The transmission of claim 14 further comprising a first rotatable toothed flange integral with said first output and a second rotatable toothed flange integral with said second output, said first rotatable toothed flange being arranged concentrically within the first restrained intermediate gear and said second rotatable toothed flange being arranged concentrically within the second restrained intermediate gear, said first rotatable toothed flange being in mesh with said first input gear and said second rotatable toothed flange being in mesh with said second input whereby rotation of the first and second input gears is transmitted to the respective said first output and said second output via the respective first rotatable toothed flange and the second rotatable toothed flange.

16. The transmission of claim 12 further comprising a motor connected to each of the first input shaft and the second input shaft whereby rotation is imparted to each of said first input shaft and said second input shaft by said motor.

17. The transmission of claim 12 further comprising a first motor connected to said first input shaft and a second motor connected to said second input shaft, said first motor and said second motor being separately controllable.

18. The transmission of claim 14 wherein:

said first input shaft, said first input gear, said first intermediate gear and said first output comprise a first transmission portion, and said second input shaft, said second input gear, said second intermediate gear and said second output comprise a second transmission portion, a motor being arranged between said first and second transmission portions, said motor being connected to each of the first input shaft and the second input shaft.

19. The transmission of claim 13 further comprising:

a first intermediate gear and a second intermediate gear with the first and second intermediate gears being arranged facing one another in a mirror image orientation, said first and second intermediate gears being rotatable, a differential mechanism connected to said first intermediate gear and said second intermediate gear thereby providing a differential function between said first output and said second output.

20. The transmission of claim 19 wherein said differential mechanism further includes a coupling and two clutches whereby the amount of torque transmitted to said first output and said second output is controllable.

* * * * *